United States Patent
Waters et al.

(10) Patent No.: US 6,256,046 B1
(45) Date of Patent: Jul. 3, 2001

(54) METHOD AND APPARATUS FOR VISUAL SENSING OF HUMANS FOR ACTIVE PUBLIC INTERFACES

(75) Inventors: Keith Waters, West Newton; Maria Loughlin, Belmont; James M. Rehg, Arlington; Sing Bing Kang, Cambridge, all of MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,444

(22) Filed: Apr. 18, 1997

(51) Int. Cl.$^7$ .................................................. G06T 15/70
(52) U.S. Cl. .......................... 345/473; 382/100; 382/103; 382/107
(58) Field of Search ........................... 345/473; 382/103, 382/107, 100

(56) References Cited

U.S. PATENT DOCUMENTS

| | | | |
|---|---|---|---|
| 5,099,322 | 3/1992 | Gove | 358/105 |
| 5,164,992 | 11/1992 | Turk et al. | 382/2 |
| 5,511,153 | 4/1996 | Azarbyejani et al. | 395/119 |
| 5,563,988 | 10/1996 | Maes et al. | 395/121 |
| 5,809,161 * | 9/1998 | Auty et al. | 382/103 X |

OTHER PUBLICATIONS

Wren, C.R., et al., "Pfinder: Real–Time Tracking of the Human Body," *IEEE Transactions on Pattern Analysis and Machine Intelligence*, 19:7, Jul. 1997 (pp. 780–785).

Darrell, T., et al., "Active Face Tracking and Pose Estimation in an Interactive Room," 1063–6919/96, 1996 IEEE, (pp. 67–72).

Takeuchi et al., "Situated Facial Displays: Towards Social Intertaction," CHI 1995 Proceedings.

Wren et al., "Pfinder: Real–Time Tracking of the Human Body," MIT Media Lab Technical Report No. 353, published in SPIE 1995, vol. 2615, Conference on Integration Issues in Large Commercial Media Delivery Systems.

* cited by examiner

*Primary Examiner*—Mark Zimmerman
*Assistant Examiner*—Lance W. Sealey
(74) *Attorney, Agent, or Firm*—Hamilton, Brook, Smith & Reynolds, P.C.

(57) ABSTRACT

An active public user interface in a computerized kiosk senses humans visually using movement and color to detect changes in the environment indicating the presence of people. Interaction spaces are defined and the system records an initial model of its environment which is updated over time to reflect the addition or subtraction of inanimate objects and to compensate for lighting changes. The system develops models of the moving objects and is thereby able to track people as they move about the interaction spaces. A stereo camera system further enhances the system's ability to sense location and movement. The kiosk presents audio and visual feedback in response to what it "sees."

44 Claims, 7 Drawing Sheets

METHOD AND APPARATUS FOR VISUAL SENSING OF HUMANS FOR ACTIVE PUBLIC INTERFACES

FIELD OF THE INVENTION

This invention relates generally to computer systems, and more particularly to computerized human-computer interfaces.

BACKGROUND OF THE INVENTION

Computer vision-based sensing of users enables a new class of public multi-user computer interfaces. An interface such as an automated information dispensing kiosk represents a computing paradigm that differs from the conventional desktop environment and correspondingly requires a user interface that is unlike the traditional Window, Icon, Mouse and Pointer (WIMP) interface. Consequently, as user interfaces evolve and migrate off the desktop, vision-based human sensing will play an increasingly important role in human-computer interaction.

Human sensing techniques that use computer vision can play a significant role in public user interfaces for kiosk-like computerized appliances. Computer vision using unobtrusive video cameras can provide a wealth of information about users, ranging from their three dimensional location to their facial expressions, and body posture and movements. Although vision-based human sensing has received increasing attention, relatively little work has been done on integrating this technology into functioning user interfaces.

The dynamic, unconstrained nature of a public space, such as a shopping mall, poses a challenging user interface problem for a computerized kiosk. This user interface problem can be referred to as the public user interface problem, to differentiate it from interactions that take place in a structured, single-user desktop environments. A fully automated public kiosk interface must be capable of actively initiating and terminating interactions with users. The kiosk must also be capable of dividing its resources among multiple users in an equitable manner.

The prior art technique for sensing users as applied in the Alive system is described in "Pfinder: Real-time Tracking of the Human Body," Christopher Wren, Ali Azarbayejani, Trevor Darrell, and Alex Pentland, IEEE 1996. Another prior art system is described in "Real-time Self-calibrating Stereo Person Tracking Using 3-D Shape Estimation from Blob Features," Ali Azarbayejani and Alex Pentland, ICPR January 1996.

The Alive system senses only a single user, and addresses only a constrained virtual world environment. Because the user is immersed in a virtual world, the context for the interaction is straight-forward and simple, and vision and graphics techniques can be employed. Sensing multiple users in an unconstrained real-world environment, and providing behavior-driven output in the context of that environment presents more complex vision and graphics problems stemming from the requirement of real world interaction that are not addressed in prior art systems.

The Alive system fits a specific geometric shape model, such as a Gaussian ellipse, to a description representing the human user. The human shape model is referred to as a "blob." This method of describing shapes is generally inflexible. The Alive system uses a Gaussian color model which limits the description of the users to one dominant color. Such a limited color model limits the ability of the system to distinguish among multiple users.

The system by Azarbayejani uses a self-calibrating blob stereo approach based on a Gaussian color blob model. This system has all of the disadvantages of inflexibility of the Gaussian model. The self-calibrating aspect of this system may be applicable to a desktop setting, where a single user can tolerate the delay associated with self-calibration. In a kiosk setting, it would be preferable to calibrate the system in advance so it will function immediately for each new user.

The prior art systems use the placement of the user's feet on the ground plane to determine the position of the user within the interaction space. This is a reasonable approach in a constrained virtual-reality environment, however this simplistic method is not acceptable in a real-world kiosk setting where the user's feet may not be visible due to occlusion by nearer objects in the environment. Furthermore, the requirement to detect the ground plane may not be convenient in practice because it tends to put strong constraints on the environment.

It remains desirable to have an interface paradigm for a computerized kiosk in which computer vision techniques are used not only to sense users but also to interact with them.

SUMMARY OF THE INVENTION

The problems of the public user interface for computers are solved by the present invention of a computer vision technique for the visual sensing of humans, the modeling of response behaviors, and audiovisual feedback to the user in the context of a computerized kiosk.

The kiosk has three basic functional components: a visual sensing component, a behavior module and a graphical/audio module. It has an optional component that contains three dimensional information of the environment, or observed scene. These components interact with each other to produce the effect of a semi-intelligent reaction to user behavior. The present invention is implemented using real-time visual sensing (motion detection, color tracking, and stereo ranging), and a behavior-based module to generate output depending on the visual input data.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
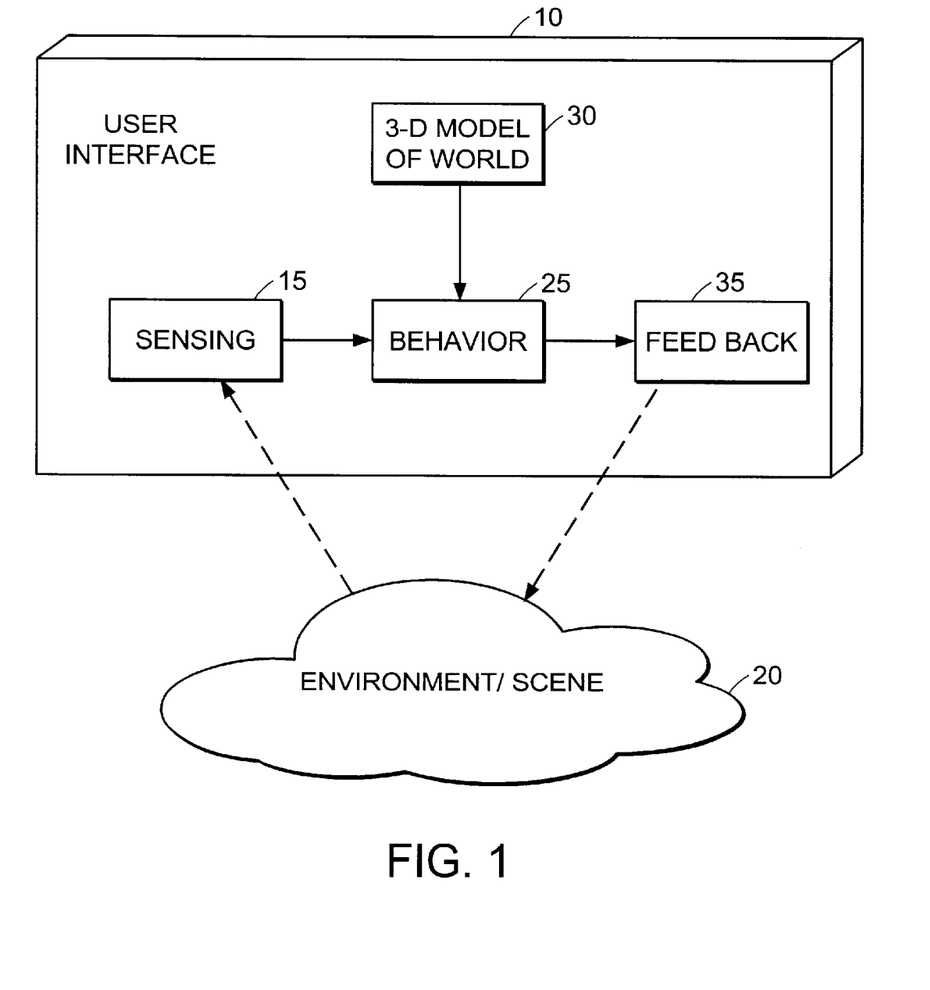
FIG. 1 is a block diagram of a public computerized user interface.

Referring now to the figures, FIG. 1 shows a public computer user interface 10. The user interface 10 has a sensing module 15 which takes in information from a real world environment 20, including the presence and actions of users. The information is processed in a behavior module 25 that uses a three dimensional model 30 to determine proper output through a feedback module 35. The three dimensional model 30 of a real world environment 20, also referred to as a scene, includes both metric information and texture that reflect the appearance of the world.

Figure 2:
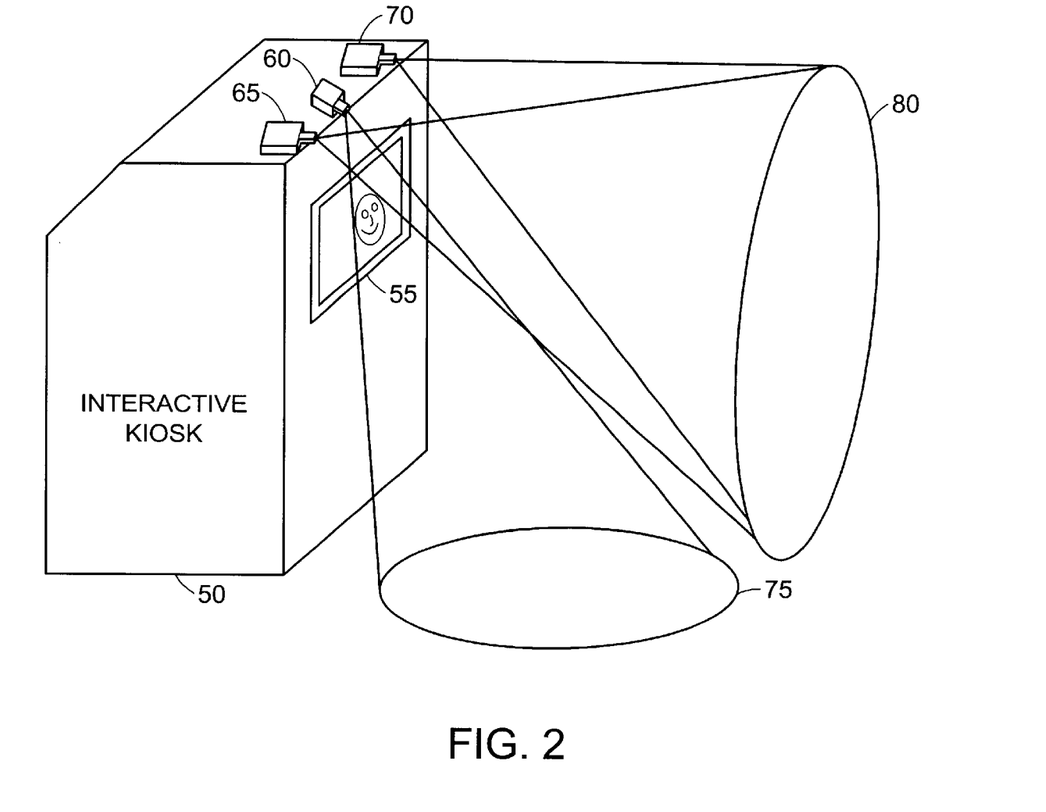
FIG. 2 shows a kiosk and interaction spaces.

FIG. 2 shows a kiosk 50 with a display screen 55 for the users of the kiosk, and a plurality of cameras 60, 65, 70 which allow the kiosk 50 to detect the presence of the users. Three cameras are shown, but a single camera, or any multiple of cameras may be used. A first camera 60 is aimed at an area on the floor. The "viewing cone" of the first camera 60 is defined to be a first interaction space 75. Second and third cameras 65, 70 are aimed to cover a distance out into the kiosk environment. In the present embodiment of the invention the second and third cameras 65, 70 are aimed out to 50 feet from the kiosk. The space covered by the second and third cameras 65, 70 is a second interaction space 80.

The kiosk 50 includes a visual sensing module 15 which uses a number of computer vision techniques, activity detection, color recognition, and stereo processing, to detect the presence or absence, and the posture of users in the interaction spaces 75, 80. Posture includes attributes such as movement and three dimensional spatial location of a user in the interaction spaces 75, 80. The kiosk digitizes color frames from the cameras that are used by the visual sensing module 15 in the kiosk.

Figure 3:
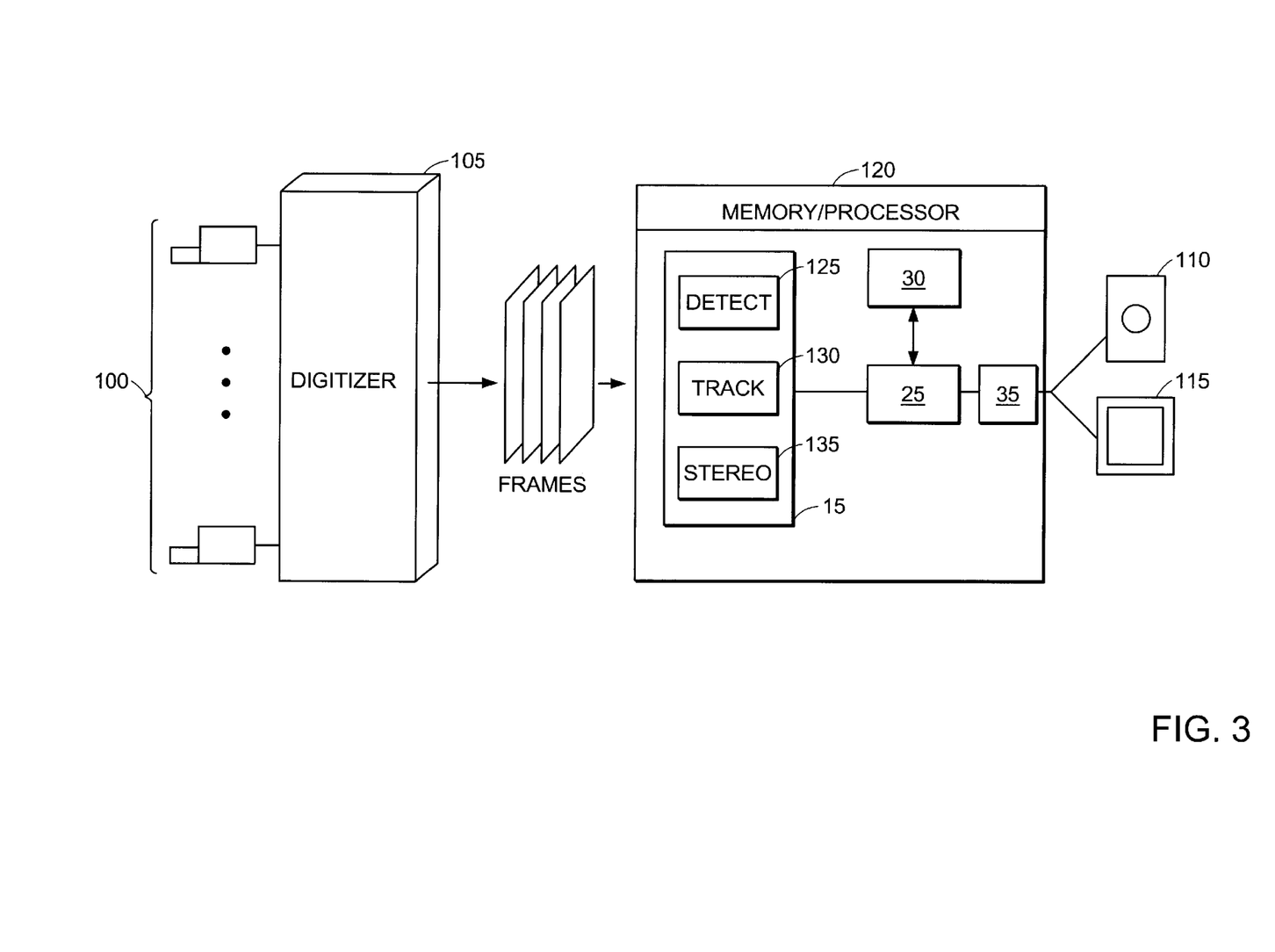
FIG. 3 shows a block diagram of the kiosk.

FIG. 3 is a block diagram of the kiosk 50. The kiosk 50 has input devices which include a plurality of cameras 100 coupled to digitizers 105 and output devices which may, for example, include a speaker 110 for audio output and a display screen 115 for visual output. The kiosk 50 includes a memory/processor 120, a visual sensing module 15, a behavior module 25, and a feedback module 35. The kiosk may also include a three dimensional model 30 representative of the scene 20. The visual sensing module 15 includes a detection module 125, a tracking module 130, and a stereo module 135 components which will be more fully described below.

The activity detection module 125 uses computer vision techniques to detect the presence and movement of users in the interaction spaces of FIG. 2. The kiosk 50 accepts video input of the interaction spaces from one or more cameras. In the first embodiment of the invention, the activity detection module 125 accepts video input from a single camera 60 which is mounted so that it points at the floor, as shown in FIG. 2. In operation, the activity detection module 125 examines each frame of the video signal in real-time to determine whether there is a user in the first interaction space 75, and if so, the speed and direction with which the person is moving. The activity detection module sends a message, or notification, to the behavior module every time a moving object enters and exits the first interaction space 75.

Figure 4:
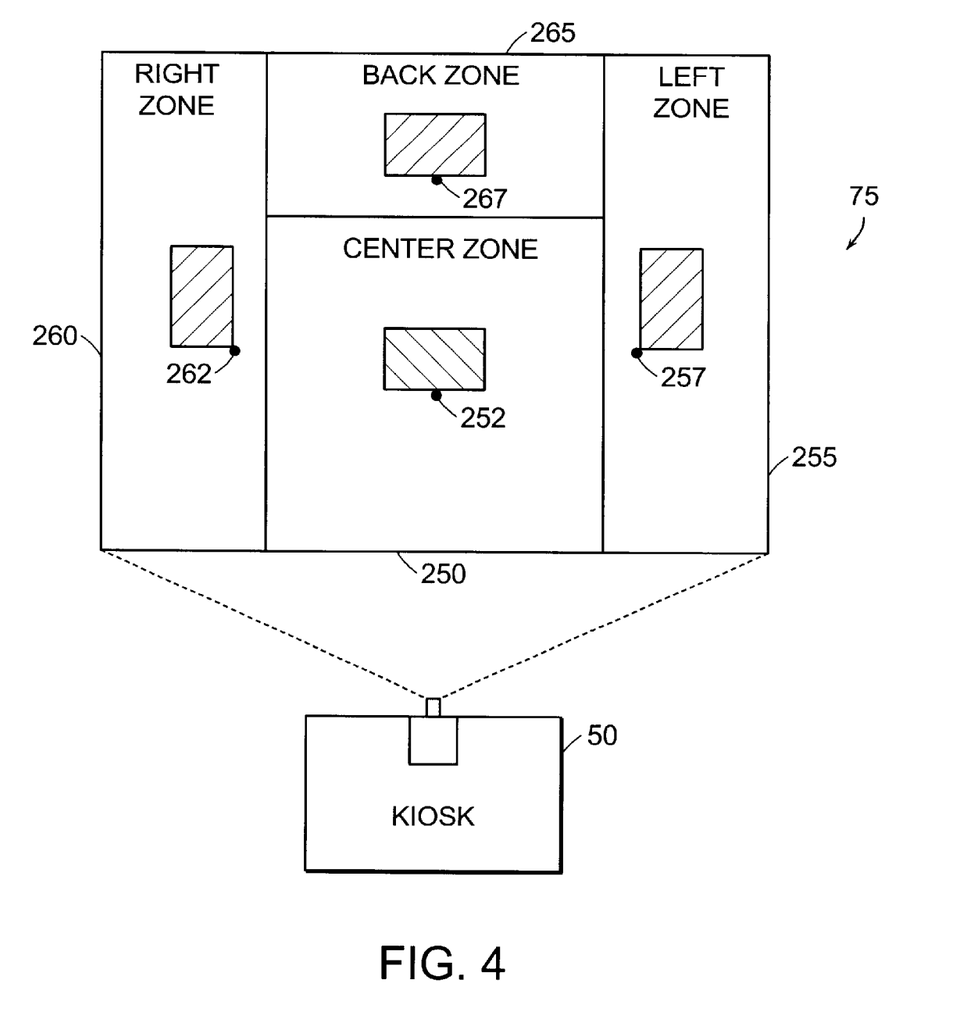
FIG. 4 shows a four zone interaction space.

The first interaction space 75 is partitioned into one or four zones in which "blobs" are independently tracked. Where a regular camera lens is used, one zone is appropriate. Where a wide-angle or fisheye lens is used, four zones, as shown in FIG. 4, are used. The four zones are defined as a center zone 250, a left zone 255, a right zone 260, and a back zone 265. In the four zone mode, computations for activity detection are performed independently in each zone. The extra computations make the activity detection program more complex but allow more accurate estimation of the velocity at which the user is moving.

When there are four zones in the first interaction space 75, the kiosk is primarily concerned with blobs in the center zone 250, i.e. potential kiosk users. When a blob first appears in the center zone 250, the blob in a peripheral zone from which the center blob is most likely to have originated is selected. The velocity of this source blob is assigned to the center blob. The activity detection program applies standard rules to determine which peripheral zone (Right, Left or Back) is the source of the blob in the center zone 250.

The activity detection module compares frames by finding the difference in intensity of each pixel on the reference frame with the corresponding pixel in a new digitized frame. Corresponding pixels are considered to be "different" if their gray levels differ by more that a first pre-defined threshold.

The activity detection program distinguishes between a person and an inanimate object, such as a piece of litter, in the first interaction space 75 by looking for movement of the object's blob between successive images. If there is sufficient movement of the object's blob between successive frames, the object is assumed to be animate. There is "sufficient motion" when the number of pixels that differ in successive images is greater than a second threshold.

Figure 5:
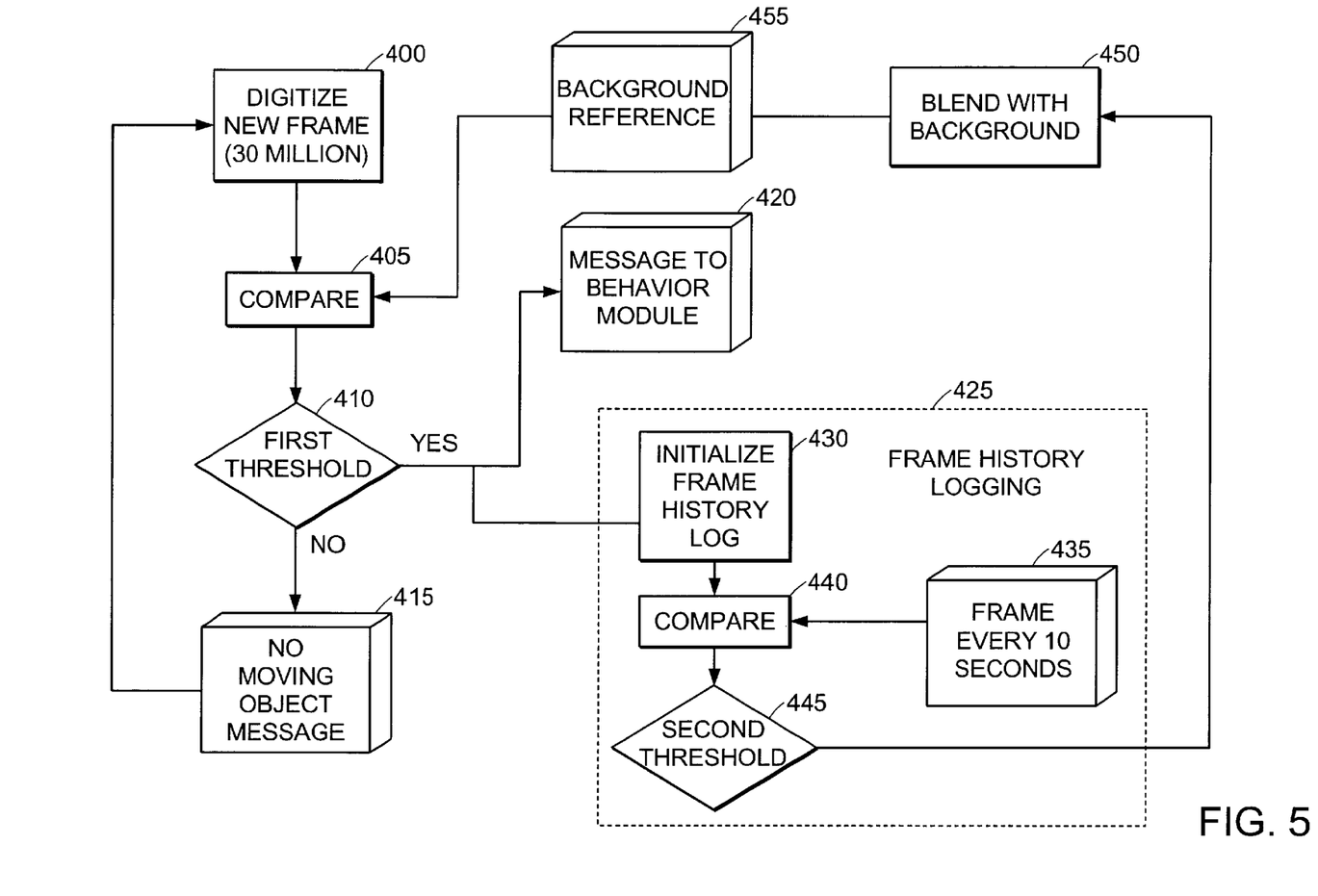
FIG. 5 shows a flow diagram of an activity detection program.

FIG. 5 shows a flow chart of the operation of the activity detection program. At initialization of the activity detection program, block 400, the first interaction space 75 is empty and the kiosk 50 records a frame of the floor in the first interaction space 75. This initial frame becomes the reference frame 455 for the activity detection program. Approximately every 30 milliseconds, a new frame is digitized, block 400. A comparison, block 405, is then made between this new frame and the reference frame 455. If the new frame is sufficiently different from the reference frame 455 according to the first predefined pixel threshold value, the activity detection module presumes there is a user in the first interaction space 75, block 410. If the new frame is not sufficiently different, the activity detection program presumes that no one is in the first interaction space 75, block 410. If the activity detection program determines that there is a user in the first interaction space 75, the activity detection program sends a message to the behavior module 25, block 420. If the activity detection program determines that there is no person in the first interaction space 75, the behavior module is sent a notification, block 415, and a new frame is digitized, block 400.

If at block 410, the difference is greater than the first predefined threshold, a notification is also provided to the behavior module, block 420. The message indicates that something animate is present in the interaction space 75. At the same time, a frame history log 425 is initialized with five new identical frames which can be the initial frame (of block 400), block 430. A new frame, captured between significant intervals (approximately once every 10 seconds in the present embodiment), block 435, is then compared with each frame in the log to determine if there is a difference above a second threshold, block 440. The second threshold results in a more sensitive reading than the first threshold. If there is a difference above the second threshold, block 445, the frame is added to the frame history, block 430, a five frame-rotating buffer. The steps of blocks 430, 440, and 445 then repeat which indicates that an animate object has arrived. If there is a difference below the second threshold, block 445, the frame is blended with the reference frame, block 450, to create the new reference frame 455. The end result of the activity detection program is that the background can be slowly evolved to capture inanimate objects that may stray into the environment, as well as accommodate slowly changing characteristics such as lighting changes.

If there is a moving object in the first interaction space 75, the activity detection program computes the velocity of that object by tracking, in each video frame, the location of a representative point of the object's blob, or form. The blob position in successive frames is smoothed to attenuate the effects of noise using known techniques such as Kalman filtering. The activity detection program maintains a record of the existence of potential users in the kiosk interaction space 75 based on detected blobs.

Velocity Computation

The activity detection program computes the velocity of users moving in the first interaction space 75 by tracking blob positions in successive frames. Velocity is used to indicate the "intent" of the blob in the first interaction space 75. That is, the velocity is used to determine whether the blob represents a potential user of the kiosk.

Velocity is computed as a change in position of a blob over time. For the velocity calculation, the blob position is defined as the coordinates of a representative point on the leading edge of the moving blob. When there is only one zone in the interaction space, the representative point is the center of the front edge of the blob. When there are four zones in the interaction space, the representative point differs in each zone. In the center and back zones, the point is the center of the front edge of the blob 252, 267. In the left zone, the point is the front of the right edge of the blob 262. In the right zone, the point is the front of the left edge of the blob 257. The velocities of blobs are analyzed independently in each zone.

Behavior Module

Figure 6:
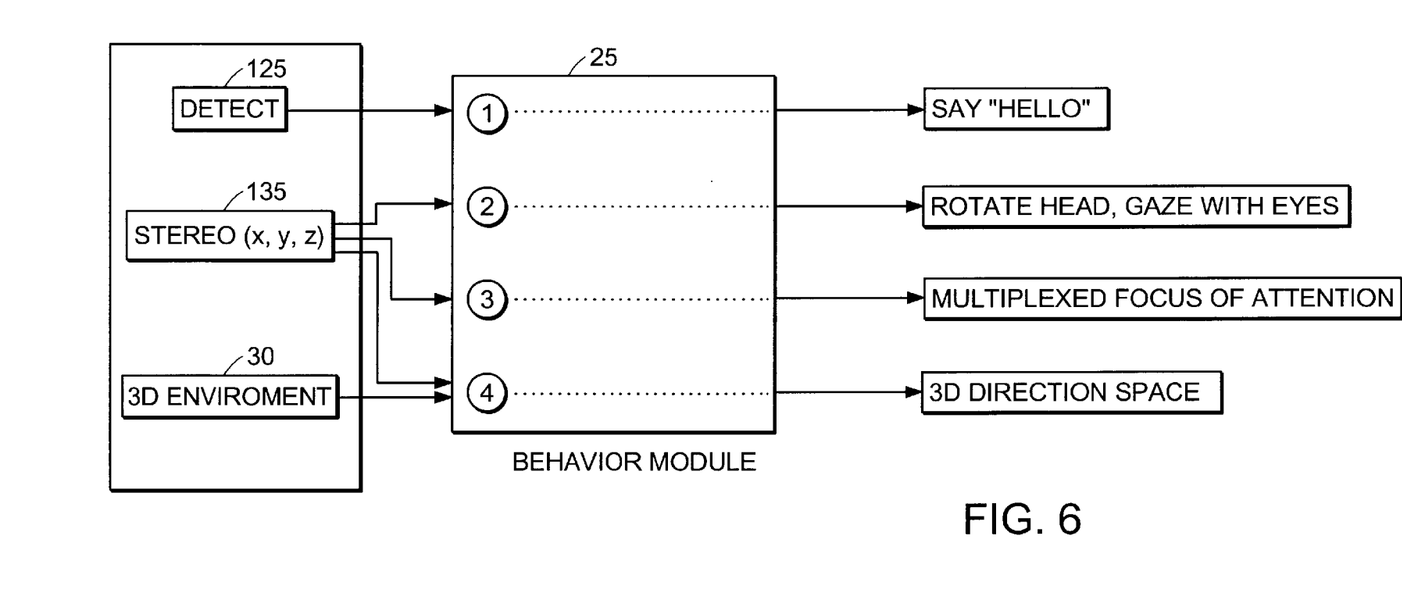
FIG. 6 is a block diagram of a behavior module process.

The behavior module 25, shown in FIG. 6, uses the output of the visual module 15 as well as a priori information such as the three dimensional model of the environment 30 to formulate actions. The behavior module 25 uses a set of rules (with the potential for learning from examples) as a means of reacting to user behavior in a manner that can be perceived as being intelligent and engaging. The mechanism for reacting to external visual stimuli is equivalent to transitioning between different states in a finite state machine based on known (or learnt) transition rules and the input state. As a simple example, the behavior module 25 can use the output of the detection module 125 to signal the feedback module 35 to acknowledge the presence of the user. It can take the form of a real time talking head in the display screen 55 saying "Hello." Such a talking head is described in "An Automatic Lip-Synchronization Algorithm for Synthetic Faces," Keith Waters and Tom Levergood, Proceedings of the Multimedia ACM Conference, September 1994, pp. 149–156. In a more complicated example, using the output of the stereo module 135 (which yields the current three dimensional location of the user/s), the behavior module 25 can command the talking head to focus attention on a specific user by rotating the head to fixate on the user. In the case of multiple users, the behavior module 25 can command the talking head to divide its attention amongst these users. Heuristics may be applied to make the kiosk pay more attention to one user than the other (for example, based on proximity or level of visual activity). In another example, by using both the stereo module 135 and three dimensional world information 30, the behavior module 25 can generate directional information, either visually or orally, to the user based on the user's current three dimensional location.

Color Blob

Color blobs are used to track the kiosk users as they move about the interaction space. The distribution of color in a user's clothing is modeled as a histogram in the YUV color space. A color histogram detection algorithm used by the present invention is described in the context of object detection in "Color Indexing" by Michael J. Swain and Dana H. Ballard, International Journal of Computer Vision, 7:1, 1991, pp. 11–32. In the present invention, the color histogram method is used for user tracking and is extended to stereo localization.

Given a histogram model, a histogram intersection algorithm is used to match the model to an input frame. A back projection stage of the algorithm labels each pixel that is consistent with the histogram model. Groups of labeled pixels form color blobs. A bounding box and a center point are computed for each blob. The bounding box and the center point correspond to the location of the user in the image. The bounding box is an x and y minimum and maximum boundary of the blob. The color blob model has advantages for user tracking in a kiosk environment. The primary benefit is that multiple users can be tracked simultaneously, as long as the users are wearing visually distinct clothing. The histogram model can describe clothing with more than one dominant color, making it a better choice than a single color model. Histogram matching can be done very quickly even for an NTSC resolution image (640 by 480 pixels), whereby a single user may be tracked at 30 frames per second. Color blobs are also insensitive to environmental effects. Color blobs can be detected under a wide range of scales, as the distance between the user and the camera varies. Color blobs are also insensitive to rotation and partial occlusion. By normalizing the intensity in the color space, robustness to lighting variations can be achieved. The center locations, however, of detected color blobs are significantly affected by lighting variation. Use of color for tracking requires a reference image from which the histogram model can be built. In the architecture of the present embodiment of the invention, initial blob detection is provided by the activity detection module, which detects moving objects in the frame. The activity detection module assumes that detected blobs correspond to upright moving people, and samples pixels from the central region of the detected blob to build the color histogram model.

Stereo

Figure 7:
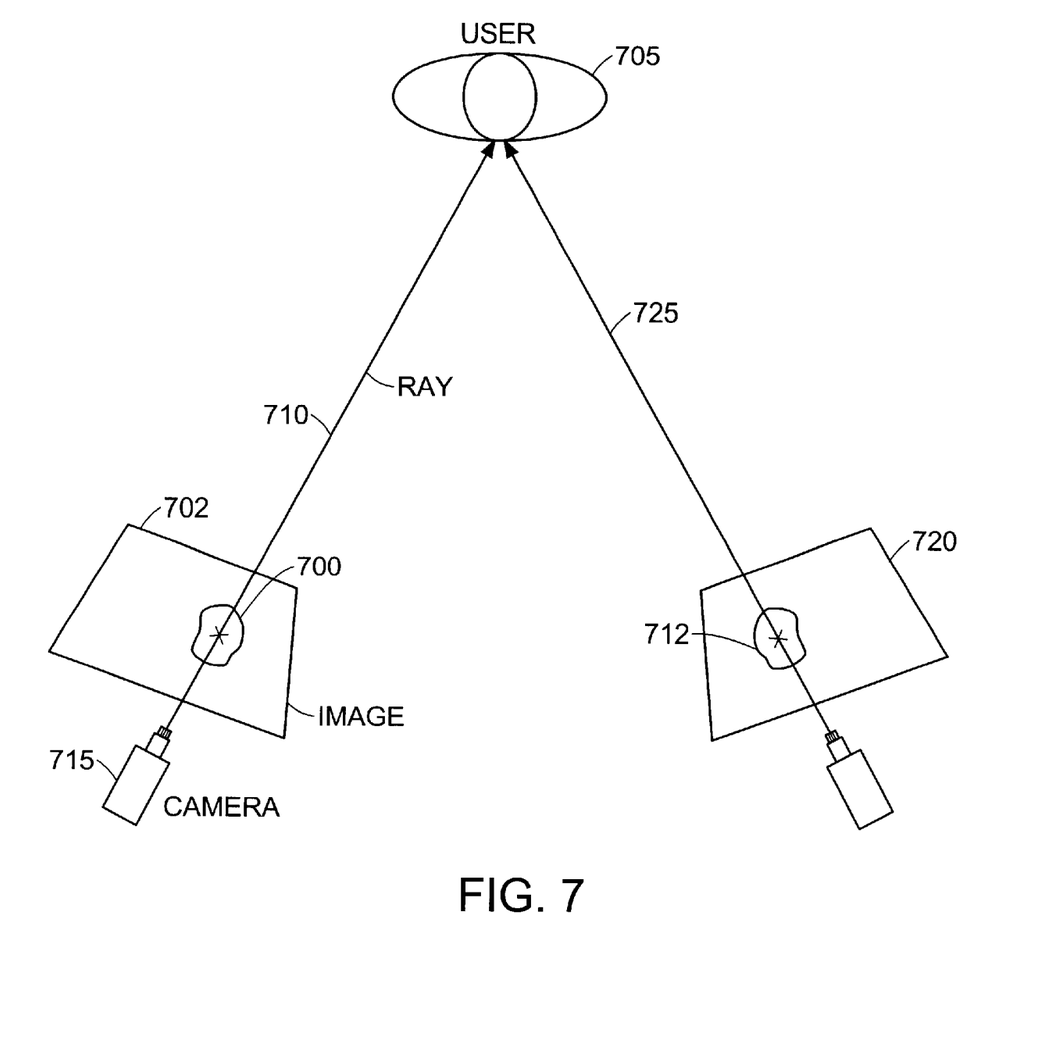
FIG. 7 shows an arrangement for stereo detection of users.

Through stereo techniques, true three dimensional information about user location can be computed from cameras in an arbitrary position relative to the scene. Stereo techniques require frames from two or more cameras be acquired concurrently, as shown in FIG. 7. This is a known method for computing detailed descriptions of scene geometry. In a classical approach, frames acquired from two cameras are processed and the correspondences between pixels in the pair of frames are determined. Triangulation is used to compute the distance to points in the scene given correspondences and the relative positions of the cameras. In the classical approach, a high level of detail requires excessive computational resources. The method of the present embodiment is based on a simpler, object-based version of the classical stereo technique. Moving objects are tracked independently using color or motion blobs in images obtained from synchronized cameras. Triangulation on the locations of the moving objects in separate views is used to locate the subjects in the scene. Because tracking occurs before triangulation, both the communication and computational costs of dense stereo fusion are avoided.

The triangulation process is illustrated in FIG. 7. Given the position of a blob 700 in a first camera image 702, the position of the user 705 is constrained to lie along a ray 710 which emanates from a first camera 715 through the center of the blob 700 and into the scene. Given the position of a second blob 712 in a second camera image 720, the position of the user 705 is constrained to lie along a second ray 725. The user 705 is located at the intersection of the first ray 710 and the second ray 725 in the scene. In actual operation, noise in the positions of the blobs 700, 712 makes it unlikely that the two rays 710, 725 will intersect exactly. The point in the scene where the two rays 710, 725 are closest is therefore chosen as the three dimensional location of the user 705.

In a preferred embodiment of the kiosk system, a pair of verged cameras with a six foot baseline, i.e. separation between the cameras, is used. The stereo approach depends on having calibrated cameras for which both the internal camera parameters and relationship between camera coordinate systems are known. A standard non-linear least squares algorithm along with a calibration pattern to determine these parameters off-line are used.

Camera synchronization is achieved by ganging the external synchronization inputs of the cameras together. Barrier synchronization is used to ensure that the blob tracking modules that process the camera images begin operation at the same time. Synchronization errors can have a significant effect on conventional stereo systems, but blobs with large size and extent make stereo systems much more robust to these errors.

It is to be understood that the above-described embodiments are simply illustrative of the principles of the invention. The present invention has been described in the context of a kiosk however alternative embodiments could be automated teller machines (ATMs), advanced multimedia TV, or office desk computers. Various and other modifications and changes may be made by those skilled in the art which will embody the principles of the invention and fall within the spirit and scope thereof.

What is claimed is:

1. A computerized interface for interacting with people, comprising:

a camera providing video input representing a region of an arbitrary physical environment as a sequence of images organized with respect to distance from the interface;

means responsive to the video input for detecting changing distance between the interface and a person in the region from the sequence of images to determine intention of the person and hence identify the person as a target for interaction; and audio visual means for rendering audio and video communication directed to the detected person in a manner such that the detected person engages in human-like informational conversant communication with the interface, content of the rendered audio and video communication changing as a function of change in detected distance between the interface and person.

2. The interface of claim 1 wherein the region of the arbitrary physical environment is an unconstrained, real-world region in which a plurality of persons can arbitrarily move.

3. The interface in claim 1, further comprising:

means for determining a velocity of the person in the region, said velocity including rate and direction of travel; and wherein a content of the communication depends on the direction of travel of the person with respect to the interface.

4. The interface of claim 1, further comprising:

means for determining a velocity of the person in the region, said velocity including rate and direction of travel; and means for determining whether to communicate based on the direction of travel of the person with respect to the interface.

5. The interface of claim 1 wherein the audiovisual means includes a display system displaying an image of a head including eyes and mouth with lips, the display system directing an orientation of the head and a gaze of the eyes at the detected person while rendering the information synchronized to movement of the lips so that the head appears to look at and talk to the person.

6. The interface of claim 1, further comprising:

means for determining a distance position and an orientation of the person in the region relative to a position of the camera.

7. The interface of claim 6, wherein the audiovisual means communicates information having a content dependent upon the determined distance position and the determined orientation of the person in the region.

8. The interface of claim 1, further comprising:

a memory, coupled to the means for detecting, the memory storing data representing a three-dimensional model of the physical environment for determining a position of the person in the region relative to objects represented in the three-dimensional model.

9. The interface of claim 8, wherein the audiovisual means communicates information having a content dependent upon the determined position of the person.

10. The interface of claim 1 wherein the sequence of images includes a reference image and a target image, each image being defined by pixels, the pixels of the reference image having a one-to-one correspondence to the pixels of the target image; and further comprising:

means for comparing the reference image to the target image to identify a group of adjacent pixels in the reference image that are different from the corresponding pixels in the target image, the identified group of pixels representing the person.

11. The interface of claim 10 wherein the means for comparing compares an intensity of each pixel of the reference image to an intensity of each corresponding pixel in the target image, and the means for detecting detects the presence of the person in the region when the intensities of at least a pre-defined number of the pixels of the reference image differ from the intensities of the corresponding pixels of the target image.

12. The interface of claim 10, further comprising:

means for blending the target image with the reference image to generate a new reference image when less than a pre-defined number of the pixels of the reference image differ from the corresponding pixels of the target image.

13. The interface of claim 1, further comprising:

a second camera spaced apart from the other camera, the second camera providing video input representing the region as a second sequence of images.

14. The interface of claim 13, further comprising:

means for determining an approximate three-dimensional position of the person in the region from the sequences of images of the cameras.

15. The interface of claim 1, further comprising:

a second camera spaced apart from the other camera, the second camera providing video input representing a different region of the physical environment than the region represented by the video input produced by the other camera, the cameras concurrently providing video input representing the regions of the physical environment.

16. The interface of claim 1 wherein the means for detecting detects respective decreasing distances of individual people of a plurality of persons in the region from the sequence of images.

17. The interface of claim 16, wherein the audiovisual means communicates information in turn with each individual of the plurality of detected persons such that the interface engages in informational communication with the plurality of detected persons.

18. The interface of claim 16 wherein the sequence of images includes a reference image and a target image, each image being defined by pixels, the pixels of the reference image having a one-to-one correspondence to the pixels of the target image; and further comprising:

means for comparing the reference image to the target image to identify a plurality of groups of adjacent pixels in the reference image that are different from the corresponding pixels in the target image, each identified group of pixels representing one of the plurality of detected persons.

19. The interface of claim 18, further comprising:

means for determining a distribution of colors in each of the group of pixels, each color distribution uniquely identifying one of the plurality of persons.

20. The interface of claim 19, further comprising:

means for concurrently tracking respective movements of each person independently in the region by the color distribution that uniquely identifies that person.

21. The interface of claim 1 wherein the region is partitioned into a plurality of sub-regions in which movement of the person can be independently detected and tracked, said subregions being organized according to distance from the interface.

22. The interface of claim 21, wherein the audiovisual means directs the communication primarily to persons that move into a predetermined one of the sub-regions.

23. A computerized interface for human-like informational conversant communications with people comprising:

a camera providing video input representing a region of an arbitrary physical environment as a sequence of images organized with respect to distance from the interface; and means responsive to the video input for determining intent of a person in the region, said means including a behavior module to aid in active engagement of human-like informational conversant communications with a person detected to be changing in distance from the interface, said means rendering audio and video information directed at the detected person in the region from the sequence of images in a manner that engages the person in a conversation, said information changing in content as a function of change in detected distance between the interface and the detected person.

24. A computerized interface as claimed in claim 23 further comprising:

means for determining a distance position and an orientation of the detected person, the distance position and orientation of the person being relative to a position of the camera.

25. A kiosk, comprising:

means for providing video input representing a region of an arbitrary physical environment to detect a presence of an object in the region;

computer means responsive to the input for determining whether position of the detected object in the region is changing in distance relative to a position of the kiosk and hence determining intent of the detected object; and means for rendering audio and video information directed at the detected object so as to engage the detected object in active informational conversant communication with the kiosk, a content of the rendered audio and video information depending upon the determined distance of the detected object relative to the kiosk.

26. A computerized method for interacting with people, comprising the steps of:

representing a region of an arbitrary physical environment as a sequence of images organized with respect to distance from the interface;

detecting a presence of and changing distance between a person and the interface in the region from the sequence of images to determine intent of the person and hence identify the person as a target for interaction; and rendering visual and audio information directed at the detected person in a manner that engages the detected person in a conversation, said rendering using a behavior module to produce information which communicates in a manner that presents human-like informational conversant communications with the detected person, the information changing as a function of change in detected distance between the person and the interface.

27. The method of claim 26 wherein the region of the arbitrary physical environment is an unconstrained, real-world region in which a plurality of persons can arbitrarily move.

28. The method of claim 26 wherein the step of rendering includes:

displaying an image of a head including eyes and a mouth with lips; and directing an orientation of the head and a gaze of the eyes at the detected person while rendering the audio information synchronized to lip movement so that the head appears to look at and talk to the person.

29. The method of claim 26 wherein the region is measured by a camera; and further comprising the step of:

determining a position of the person in the region relative to a position of the camera.

30. The method of claim 29, wherein the step of rendering audio and visual information includes information having a content dependant upon the determined position of the person in the region.

31. The method of claim 26, further comprising the step of:

determining a position of the person in the region relative to a pre-defined position of an object in the physical environment.

32. The method of claim 31, wherein the step of rendering audio and visual information includes information having a content dependant upon the determined position of the person in the region.

33. The method of claim 26 wherein the sequence of images includes a reference image and a target image, each image being defined by pixels, the pixels of the reference image having a one-to-one spatial correspondence to the pixels of the target image; and further comprising the steps of:

comparing the reference image to the target image to identify a group of adjacent pixels in the reference image that are different from the corresponding pixels in the target image, the identified group of pixels representing the person.

34. The method of claim 33 wherein the step of comparing compares an intensity of each pixel of the reference image to an intensity of each corresponding pixel in the target image and the step of detecting detects the presence of the person in the region when the intensities of at least a pre-defined number of the pixels of the reference image differ from the intensities of the corresponding pixels of the target image.

35. The method of claim 33, further comprising the step of:

blending the target image with the reference image to generate a new reference image when less than a pre-defined number of the pixels of the reference image differ from the corresponding pixels of the target image.

36. The method of claim 26, further comprising the steps of:

measuring the region as a second sequence of images; and determining from the sequences of images an approximate three-dimensional position of the person in the region.

37. The method of claim 26, further comprising the step of:

detecting a plurality of persons in the region in the sequence of images.

38. The method of claim 37, wherein the step of rendering audio and visual information includes directing the information, in turn, at each detected person in the region.

39. The method of claim 37 wherein the sequence of images includes a reference image and a target image, each image being defined by pixels, the pixels of the reference image having a one-to-one correspondence to the pixels of the target image; and further comprising the step of:

comparing the reference image to the target image to identify a plurality of groups of adjacent pixels in the reference image that are different from the corresponding pixels in the target image, each identified group of pixels representing one of the plurality of detected persons.

40. The method of claim 39, further comprising the step of:

determining a distribution of colors in each of the group of pixels, each color distribution uniquely identifying one of the plurality of persons.

41. The method of claim 40, further comprising the step of:

concurrently tracking movements of each person independently in the region by the color distribution that uniquely identifies that person.

42. The method of claim 26, further comprising the steps of:

determining a velocity of the person moving in the region, the velocity including a direction of travel; and wherein the step of rendering audio and visual information includes information having a content dependant on the direction of travel of the person.

43. The method of claim 26, further comprising the steps of:

determining a velocity of the person moving in the region; and determining whether to render audio and video information based on the velocity of the person.

44. A method for interacting with an animate object, comprising the steps of:

measuring a region of an arbitrary physical environment to detect a presence of an animated object in the region;

determining a change in relative distance of the detected object in the region; and rendering audio and video information directed at the detected object using a behavior module so as to engage the detected object in informational conversant communication, content of the rendered audio and video information depending upon the determined change in relative distance of the detected object.

* * * * *